Patented Jan. 30, 1923.

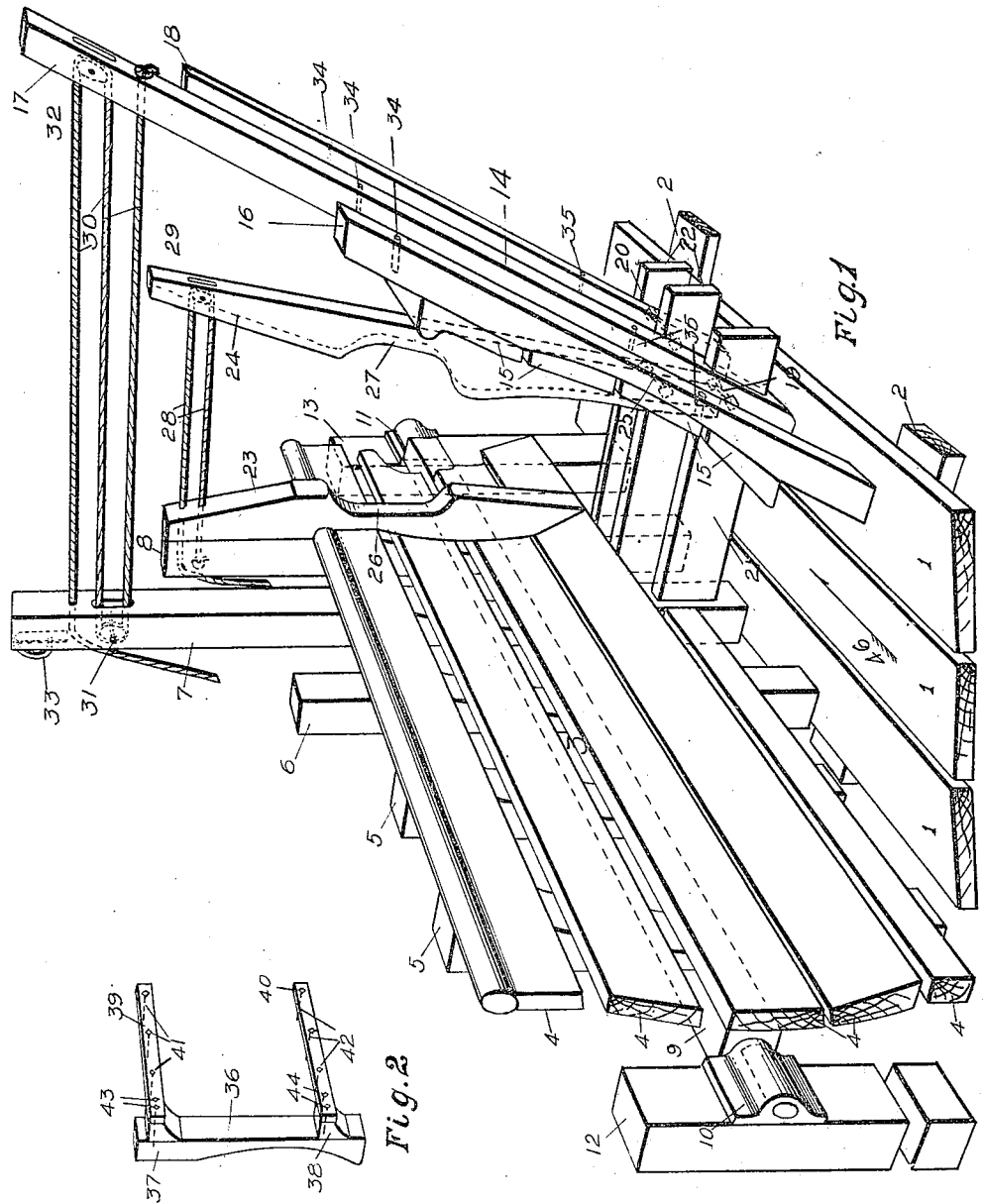

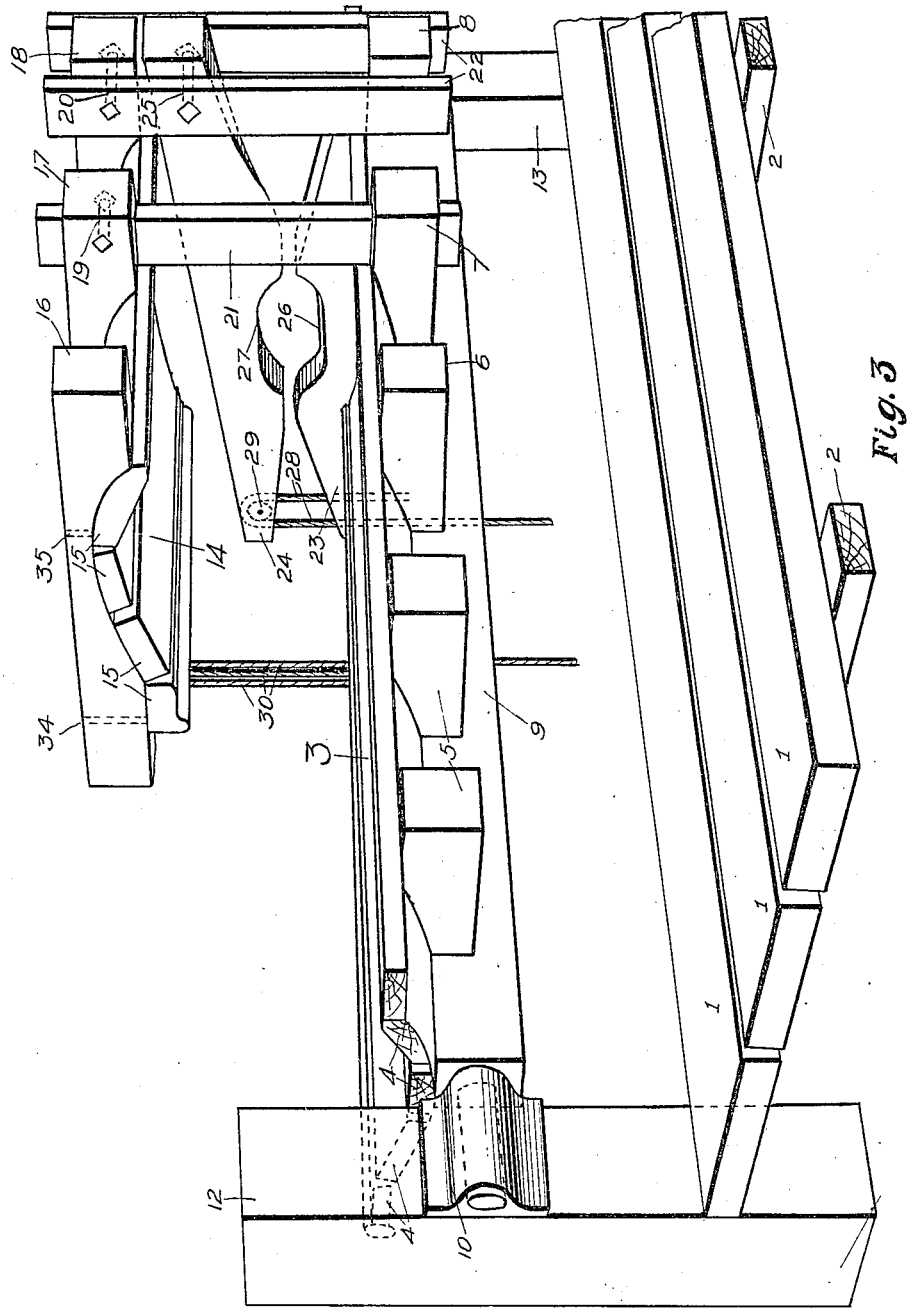

1,443,561

UNITED STATES PATENT OFFICE.

WILLIAM CLARK, OF PETROLIA, CALIFORNIA.

ROTATABLE STOCK CHUTE.

Application filed June 2, 1921. Serial No. 474,412.

*To all whom it may concern:*

Be it known that I, WILLIAM CLARK, a citizen of the United States, residing at Petrolia, in the county of Humboldt and State of California, have invented new and useful Improvements in Rotatable Stock Chutes, of which the following is a specification.

This invention relates to animal husbandry apparatus.

The object of this invention is to afford a means whereby calves, small cattle, and other animals can be securely held while being earmarked or tattooed, branded, vaccinated, or surgically treated, within an apparatus which is closed on the animal while the latter is in a standing position and then is rotated to a horizontal position in which the animal can be worked upon while lying on its side.

Heretofore in branding and otherwise handling cattle, particularly where large numbers are handled, it has been customary to rope calves and cattle and to throw them to the ground. This usually caused considerable exertion by the men engaged and resulted in exciting, overheating and bruising the cattle, which latter conditions are always undesirable, particularly when branding or surgery is contemplated.

Various forms of apparatus to hold and throw the cattle have been devised, but all such have been awkward to handle or have only partly reduced the struggling action of the animal. The present invention makes it possible to drive or lead an animal to the position where the forward half is quietly enclosed by the apparatus. The animal is rotated into a position in which struggling is reduced to a minimum because its rear feet cannot engage any part of the apparatus against which to push or kick. This is not possible where the animal is laid on the ground or is secured to a platform resting on the ground.

The present invention likewise provides for holding the animal securely by apparatus which embraces the forward half and chest portion but leaves the rear and one flank open and exposed for branding and surgery and unincumbered by ropes, beams or other parts of the apparatus. This arrangement thus facilitates the movements of the persons performing the branding or surgery.

One embodiment of the invention specifically designed for handling calves is described and claimed in the following specification and claims and illustrated in the accompanying drawings in which:

Figure 1 is a perspective drawing of the animal chute in the upright position, as seen from the rear and to the right looking forward, or in the direction that the animal is driven into the chute;

Figure 2 is a perspective drawing of an extension to be attached to the short or hinged side of the chute, to be used when the larger animals are being handled; and Figure 3 is a perspective drawing of the animal chute in the rotated position from the same point of view as in Figure 1 showing the short or hinged side closed up as it would be when the same engages the animal and the latter is in position to be worked upon.

Similar numerals throughout the drawings indicate similar parts.

A side 3, made up of horizontal slats 4 fastened to upright ribs or posts 5, 6, 7 and 8, is mounted adjacent a platform 1, supported on sills 2. In the specific embodiment here disclosed, the side 3 is approximately 8 feet long, and the top of the upper slat approximately 4 feet above the platform 1. Axle 9 is fastened to the back of side 3 about 18 inches above the platform 1, this axle being mounted in bearings 10 and 11 on posts 12 and 13. The hinged side 14 is about 32 inches long, extending from post 16 to post 18, is of the same height as side 3, and is made up of horizontal slats fastened to the ribs or posts 16, 17 and 18, side 14 being hinged at joints 19 and 20 and connected to the long side 3 at the bottom by the single tie 21 and the double tie 22, these ties 21 and 22 being rigidly attached to the bottom of ribs 7 and 8 of side 3. The stanchion 23 is fastened to side 3 at rib 8, while stanchion 24 is hinged at 25 to the double tie 22. Yokes 26 and 27 are cut in stanchions 23 and 24 respectively.

Means for operating the apparatus is provided by a rope 28 operating over sheave 29 in stanchion 24 and is used to close yokes 26 and 27 by drawing the stanchion 24 over toward the stanchion 23. Similarly a rope 30, operating over sheaves 31 and 32, is used to draw the side 14 over toward the side 3. A handle 33 is secured by post 7, said post being about 7 feet long, and serving to manipulate the rotatable side 3. In the ribs or posts 16, 17 and 18 are bolt holes 34 and 35, their purpose being explained below. The holes 35 are located so as to lie within the space between the two bottom slats of side 14.

An extension rib 36, shown in Figure 2, is used when larger animals are being handled, and is about 6 inches wide and is fastened to the extension arms 39 and 40 by means of bolts 43 and 44, the said extension arms 39 and 40 being attached to the back of side 14 by bolts 41 and 42 inserted in holes 34 and 35, as shown in Figures 1 and 3. The curved face of the extension rib 36, when the extension is attached to the chute, lies in the same surface as the inside face of side 14, and blocks 37 and 38 fill out the distance between the back of 36 and the extension arms 39 and 40. While a chute of the approximate dimensions here given is suitable for calves, it will be understood, of course, that the size will be modified to suit the animals being handled.

In using this apparatus, it is placed at the end of a narrow passage leading from a small corral, side 3 being directly in line with one side of the passage, and the opposite side of the passage being continued up to side 14.

The calf is driven from the corral through the narrow passage into the chute in the direction indicated by arrow 46. As its head passes between and through the stanchions 23 and 24, the stanchion 24 is pulled over toward stanchion 23 by a man stationed directly behind post 8, who pulls down on rope 28, thus closing yokes 26 and 27 around the calf's neck. At the same time that stanchion 24 is pulled over, the hinged or folding side 14 is pulled over toward side 3 by a second man stationed behind post 7, who pulls down on rope 30 operated over sheaves 31 and 32, thus closing the hinged or folding side 14 against the side of the animal, squeezing the calf from its yoke back to the end of its ribs against the side 3, and leaving the hip and flank free. Immediately after the folding side has been closed, the man standing behind the post 7 holding the rope 30 taut in one hand, places the foot against the side of 3, grasps the handle 33 in the other hand, and pulls the chute over. In handling large calves the man standing behind post 8 reaches over the top of the chute and assists in rotating the chute by pulling upon stanchion 24 with one hand while holding rope 28 taut in the other. The axle is placed below the middle of the height of the animal, and as the handle 33 is high, great leverage is secured, and the animal being at once thrown off its feet, assists in rotating the chute by its own weight.

The chute is rotated to a position where side 3 is a little beyond the horizontal with the posts resting on any convenient support. In this position the calf is securely held within the chute, its neck being grasped between the yokes 26 and 27, and the larger portion of its body held firmly between the sides 3 and 14, with the hip and flank exposed. The head of the calf rests upon the side 3 which extends beyond stanchion 23. A third man immediately earmarks the calf as soon as the chute has been rotated, and while he is doing this a fourth man, whose duty it is to drive the calves from the corral, places a short rope around both hind legs of the calf and pulls it back taut, and fastens it to any convenient part of the fence, thus holding the rear legs secure so that the calf cannot kick. The man who has earmarked the calf proceeds at once to the rear of the chute, and standing behind the hips of the animal, brands or otherwise treats or operates on the calf. The rope spoken of above is applied only when a bull calf is being handled, but the calf is so securely held by the chute itself that the rope is not necessary on heifer calves.

The calf having been earmarked, branded, tattooed, vaccinated, or otherwise operated upon, the chute is rotated back to the original position by the same means which rotated it to the horizontal position, again setting the animal on its feet. The man at the rear of the chute then places a small pole across the trap behind the calf, compelling it to go ahead and pass out through the front end of the chute, when the man tending the stanchions, pushing back on stanchion 24, pushes both it and the side 14 back to their fully open positions. In Figure 1, stanchion 24 is shown partly closed in the position it assumes when the calf is driven into the chute, being so placed to assist in quickly catching the animal.

The sides of the chute are curved as shown in the drawings so that when they are closed up they form a pocket fitting the body of the animal, and as the bottom is thus narrowed the animal is prevented from sliding from the chute when the chute and calf are rotated to the horizontal position. To prevent the calf from being bruised the inner faces of the side of the chute may be well padded at all places where the calf comes in contact with the same.

The drawings show a chute arranged to leave the right hip and flank of the animal exposed for branding, but the arrangement of chute can obviously be constructed to reverse the sides and allow the chute to rotate in the opposite direction and permit branding on the left side or hip.

The apparatus of this invention has made it possible to handle cattle with unusual dispatch. With the number of men hereinbefore mentioned to operate the machine, it has been possible to brand and operate on calves at the rate of forty calves per hour. It has been possible to vaccinate calves at such a rate that they are not in the chute much longer than one minute each. In all treatments the cattle enter the chute in a cool condition, and do not have time to get overheated. These conditions were substantially impossible heretofore, where they were roped, thrown to the ground and bruised. Treatments are expedited because there is no part of the apparatus to interfere with the movements of the person performing the branding or surgical operation.

I claim:

1. In an animal chute, a support and a side member rotatably journaled in said support and having rigid means to secure an animal thereto, said means being pivotally supported at one end by the side member the journal being located at approximately half the height of the animal, said side member and securing means together forming an animal holding device, the portion thereof normally adjacent the rear feet of the animal being bottomless and the lower edge of said side member adjacent said bottomless portion being free from any lateral projection extending toward said securing means or into the space between said side member and said securing means.

2. In an animal chute, a support, a side member rotatably journaled in said support and having rigid clamping means to secure an animal thereto, said means being pivotally supported at one end by the side member, said securing means rigidly confining the neck and front half of the body of the animal and the rearmost part of said clamping means being opposite the middle of said side member, leaving the head, and one side of the flank and hip exposed and accessible, the journal being located at approximately half the height of the animal, and means for applying a turning force to the side member, said side member and securing means together forming an animal holding device, the portion thereof normally adjacent the rear feet of the animal being bottomless and the lower edge of said side member adjacent said bottomless portion being free from any lateral projection extending toward said securing means or into the space between said side member and said securing means.

3. In an animal chute, a support, a side member rotatably journaled in said support at a height substantially one-half that of the animal and means to secure an animal thereto, comprising a neck yoke, one element thereof being rigidly attached to the side member, the other being pivotally supported adjacent the side member, and means for closing the two yoke elements upon each other to grip the neck of the animal therebetween, said means comprising a cable and sheave, a curved body-holding member also pivotally supported by the side member having a forward clamping portion positioned adjacent said neck yoke and a rearmost clamping portion adapted to engage the middle portion of the trunk of an animal, and independent means for moving the body-holding member toward the side member.

4. In an animal chute, a support, a side member rotatably journaled in said support at a height substantialy one-half that of the animal and means to secure an animal thereto, comprising a neck yoke, one element thereof being rigidly attached to the side member, the other being pivotally supported adjacent the side member, means for closing the two yoke elements upon each other to grip the neck of the animal therebetween, and a body-holding element also pivotally supported adjacent the side member, the animal-holding means thus formed being bottomless at the rear thereof in the region adjacent the rear feet of the animal and clear of any part projecting into the space between said side member and said securing means and independent means for closing the said body-holding element against the side member, to grip the forward half of the body of the animal, said closing means comprising a cable and sheave mounted respectively on the body-holding element and the side member, the cable being secured to the body-holding element, passing thence around the sheave on the side member, back to and around the sheave on the body-holding element, and again to the other side, whereby a greatly increased force for closing the body-holding element against the side member is obtained.

5. In an animal chute, a support, a side member rotatably journaled in said support, at a height substantially one-half that of the animal, and rigid means to secure the animal thereto, said means comprising a plurality of cross beams rigidly secured to the bottom of the side member near its forward end only and projecting therefrom, and means for securing the forward half of the animal to the side member, said means being pivotally secured to the far ends of said cross beams.

6. In an animal chute, a support, a side member rotatably journaled in said support at a height substantially one-half that of the animal, and fastening means to secure the animal to said side member, said means comprising combined support and clamp means, said support means comprising a plurality of cross beams rigidly secured to the bottom of the side member near its forward end only and projecting therefrom, and leaving the rest of the bottom of said rotatable member entirely free and unobstructed, and said clamp means extending only along the forward portion of the side member for securing the forward half of the animal to the side member, and being pivotally secured to the far ends of said cross beams.

7. In an animal chute, a support, a side member rotatably journaled in said support at a height substantially one-half that of the animal, and fastening means to secure the animal to said side member, said means comprising combined support and clamp means, said support means comprising a plurality of cross beams rigidly secured to the bottom of the side member near its forward end only and projecting therefrom, and leaving the rest of the bottom of said rotatable member entirely free and unobstructed, said clamp means extending only along the forward portion of the side member for securing the forward half of the animal to the side member, and being pivotally secured to the far ends of said cross beams, and an extension piece removably attached to the rear end of said fastening means, said extension piece comprising a body engaging member and two forwardly extending portions secured thereto and detachably secured to animal clamping means.

In testimony whereof I affix my signature.

WILLIAM CLARK.